(12) United States Patent
Koya

(10) Patent No.: US 6,700,572 B1
(45) Date of Patent: Mar. 2, 2004

(54) THREE-DIMENSIONAL DISPLAY

(76) Inventor: Yoshihito Koya, 9-607, 1-Ban, Namiki 2-Chome, Kanazawa-Ku, Yokohama-Shi, Kanagawa-Ken (JP)

( * ) Notice: Subject to any disclaimer, the term of this patent is extended or adjusted under 35 U.S.C. 154(b) by 0 days.

(21) Appl. No.: 09/565,607

(22) Filed: May 4, 2000

(30) Foreign Application Priority Data

May 13, 1999 (JP) ............................................ 11-132600

(51) Int. Cl.⁷ ............................................... G06T 15/00

(52) U.S. Cl. ..................................................... 345/419

(58) Field of Search ............................... 345/419, 473, 345/474, 6, 472, 472.2, 589, 597, 653, 660, 667, 668, 669, 670, 671; 348/47, 51, 751, 761; 313/402, 406; 359/618

(56) References Cited

U.S. PATENT DOCUMENTS

| | | | | |
|---|---|---|---|---|
| 3,735,179 A | * | 5/1973 | Kaplan ........................ | 313/402 |
| 5,949,390 A | * | 9/1999 | Nomura et al. ................ | 345/32 |
| 6,278,466 B1 | * | 8/2001 | Chen ........................... | 345/473 |
| 6,329,963 B1 | * | 12/2001 | Chiabrera et al. .............. | 345/6 |
| 6,392,660 B2 | * | 5/2002 | Karjalainen ................... | 345/660 |
| 6,414,709 B1 | * | 7/2002 | Palm et al. .................... | 348/47 |

OTHER PUBLICATIONS

"*3D Vision Display*," Nikkei Electronics, Apr. 6, 1998 (No. 713), pp. 35–36 (With Translation).

Dodgeson, Neil A., et al., "*Time–multiplexed autostereoscopic camera system*," University of Cambridge Computer Laboratory, 12 pages.

Moore, John R., et al., "*Time–multiplexed color autostereoscopic display*," Computer Laboratory, University of Cambridge, 9 pages.

* cited by examiner

*Primary Examiner*—Matthew C. Bella
*Assistant Examiner*—Lance W. Sealey
(74) *Attorney, Agent, or Firm*—Burr & Brown

(57) ABSTRACT

A three-dimensional display is provided that simplifies the display system and reduces hardware costs by using a predetermined mask unit positioned before the display screen of a CRT displaying an image. The three-dimensional display includes a synthesis unit, display unit, and mask plate. The shift circuit of the synthesis unit shifts the images of the perspective cameras from the image of the reference camera, while the mapping circuit combines the reference image and the shifted images of the cameras. Further, the filter circuit removes unnecessary pixels from the synthesized image, then the sync signal insertion circuit inserts a horizontal sync signal and vertical sync signal to produce a synthesized image. This synthesized image is displayed on the CRT display screen of the display unit. Light from the images captured by the cameras is focused at the viewing perspectives P1, P2, and P3 by the holes of the mask unit.

9 Claims, 17 Drawing Sheets

THREE-DIMENSIONAL DISPLAY

BACKGROUND OF THE INVENTION

1. Field of the Invention

The present invention relates to a three-dimensional display able to display the image of a three-dimensional object while giving a three-dimensional sensation.

2. Description of the Related Art

FIG. 30 is a general block diagram of an example of a three-dimensional display of the related art.

This three-dimensional display enables images of an object 100 taken from three different perspectives, that is, by the cameras 111 to 113, to be viewed at viewing perspectives P1 to P3 corresponding to the cameras 111 to 113 so as to give the user a three-dimensional visual sensation.

That is, an object 100 with a sectional shape including a white front face 101, a blue side face 102, and a red side face 103 is captured by different perspective cameras 111 to 113. The captured images S1 to S3 are sent to a high speed CRT 120.

At this time, the image S1 of the object 100 taken by the camera 111 is displayed in the form as shown in FIG. 31, the image S2 of the object 100 obtained by the camera 112 is displayed in the form as shown in FIG. 32, and the image S3 of the object 100 obtained by the camera 113 is displayed in the form as shown in FIG. 33.

These images S1 to S3, as shown in FIG. 30, are successively sent to the CRT 120 and displayed at a predetermined timing at the CRT 120.

This being so, a shutter device 130 operates at the timing of display of the images S1 to S3 and changes the path of the light emitted from the CRT 120 at the time of display of the images S1 to S3.

Specifically, the light at the time of display of the image S1 is refracted at the shutter device 130 as shown by the solid line, the light at the time of display of the image S2 passes out from the shutter device 130 as shown by the two-dot chain line, and the light at the time of display of the image S3 is refracted at the shutter device 130 as shown by the one-dot chain line.

A Fresnel lens 140 arranged behind the shutter device 130 is used to focus the light passing through the shutter device 130 at the viewing perspectives P1 to P3 corresponding to the cameras 111 to 113.

That is, the image S1 taken by the camera 111, the image S2 taken by the camera 112, and the image S3 taken by the camera 113 are displayed on the CRT 120 by time division and are shown to the viewing perspectives P1 to P3 corresponding to the positions of arrangement of the cameras 111 to 113 at the timings of the time division, so the user, due to the change in the viewing perspectives, gets the sensation of viewing the object displayed on the CRT 120 from angles corresponding to those viewing perspectives and thereby obtains a three-dimensional sensation.

There are however the following problems with a three-dimensional display according to the above related art.

In the three-dimensional display of the related art, it is necessary to display the images S1 to S3 obtained by the cameras 111 to 113 on the CRT 120 by time division. The system for doing this is complicated.

Further, if the refresh time is long at the time of switching the images S1 to S3 at the CRT 120, an after image is caused—making the system unusable. Therefore, an expensive CRT 120 able to refresh images in a short time becomes necessary.

Further, a shutter device 130 comprised of an optical lens or liquid crystal shutter and a Fresnel lens 140 becomes essential, so not only does the hardware itself become large in size, but the price also ends up becoming high.

SUMMARY OF THE INVENTION

The present invention was made to solve the above problems and its object is to provide a three-dimensional display designed to simplify the display system and reduce the cost of the hardware by enabling viewing of a three-dimensional image by just providing a predetermined mask unit in front of the CRT or other display unit displaying the image.

To achieve the above object, according to an aspect of the invention, there is provided a three-dimensional display comprising a synthesis unit for fetching a plurality of types of images capturing an object from a plurality of different perspectives and combining the plurality of types of images so that one image shifts with respect to an image of a reference perspective corresponding to the distance between the reference perspective and the perspective of that one image and in the direction thereof and thereby generating a single synthesized image, a display unit including a display screen having a number of pixels of at least the number of pixels of the single synthesized image generated at the synthesis unit for displaying the synthesized image on the display screen, and a mask unit comprised of a thin sheet member placed in front of the display screen of the display unit and having a plurality of holes formed at predetermined intervals at locations facing the pixels of the display screen.

Due to this configuration, the synthesis unit fetches the plurality of types of images capturing an object from a plurality of different perspectives and combines the plurality of types of images so that one image shifts with respect to the image of the reference perspective corresponding to the distance between the reference perspective and the perspective of that one image and the direction thereof and thereby generates a single synthesized image. Further, the display unit displays this single synthesized image on the display screen. As a result, a plurality of light beams from the images included in the single synthesized image pass through the holes of the mask unit and focus at locations in accordance with the perspectives of the images. Therefore, the user can view images similar to those seen when looking at an object from different perspectives by moving the viewing perspective to different focusing locations.

According to an embodiment of the invention, there is provided a three-dimensional display, wherein the shape holes of the mask unit are circular or polygonal holes. In particular, the diameter of the circular or polygonal holes is preferably substantially equal to the diameter of the pixels of the display screen. Further, as another example, according to an embodiment of the invention, the plurality of holes of the mask are slit-shaped elongated holes. In particular, the width of the slit-shaped elongated holes is preferably substantially equal to the diameter of the pixels of the display screen.

Further, as an example of the specific configuration of the synthesis unit, according to an embodiment of the invention, there is provided a three-dimensional display, wherein the synthesis unit is comprised of a zoom unit for enlarging or reducing the plurality of types of images to generate zoom images, a shift unit for shifting a zoom image based on a zoom image corresponding to the image of the reference perspective, and a mapping unit for mapping the reference zoom image and the shifted zoom image in that state in a table having substantially the same pixel configuration as the pixel configuration of the display screen to thereby form the above single synthesized image.

It is, however, preferable to remove the unnecessary pixels which should not be viewed from the holes of the mask unit from among the pixels of the synthesized image and then display the image on the display screen. Therefore, according to an embodiment of the invention, there is provided a three-dimensional display, wherein the synthesis unit is provided with a filter unit for comparing (when displaying on the display screen pixels of an image capturing the object from one of the perspectives and included in the single synthesized image) an angle of incidence of light from those pixels to the holes of the mask unit closest to those pixels and a visual angle when capturing a portion of the object shown by those pixels from that perspective and, when these angles are not equal, removing those pixel from the single synthesized image.

Further, when there are few images making up the synthesized image, it is preferable that the viewed image change substantially continuously when the user changes its viewing perspective. Therefore, according to an embodiment of the invention, there is provided a three-dimensional display, further comprising a correction unit for mapping at least one image the same as one image between adjoining images in the single synthesized image.

Further, according to an embodiment of the invention, there is provided a three-dimensional display, preventing contact between an area including a group of pixels of the display screen centered on a single hole and having an angle of incidence of light from outermost peripheral pixels to the single hole substantially equal to the maximum visual angle of the perspective and an area including a group of pixels of the display screen centered on another hole by setting an interval between the single hole and the other hole and providing a condenser lens of a size including even the outside pixels of the area for each area.

Due to this configuration, due to the Fresnel lens, not only the light from the pixels inside the above area, but also the light from pixels outside the area pass through the holes and are viewed by the user.

BRIEF DESCRIPTION OF THE DRAWINGS

These and other objects and features of the present invention will become more readily apparent from the following detailed description of a presently preferred embodiment of the invention taken in conjunction with the accompanying drawings, in which:

FIGS. 5a to 5c are plan views of the state of shifting a zoom image, wherein FIG. 5a shows the state of non-shifting a reference zoom image and FIGS. 5b and 5c show the state of shifting another zoom image;

FIGS. 16a to 16c are plan views of the state of shifting zoom images, wherein FIG. 16a shows the original image taken by the camera 12, FIG. 16b shows the original image taken by the camera 11, and FIG. 16c shows the original image taken by the camera 13;

FIGS. 17a to 17c are plan views of the state of shifting zoom images, wherein FIG. 17a shows the state of shifting of a zoom image taken by the camera 11, FIG. 17b shows the state of shifting a zoom image taken by the camera 12, and FIG. 17c shows the state of shifting a zoom image taken by the camera 13;

DETAILED DESCRIPTION OF THE INVENTION

Preferred embodiments of the present invention will be explained next with reference to the drawings.

First Embodiment

Figure 1:
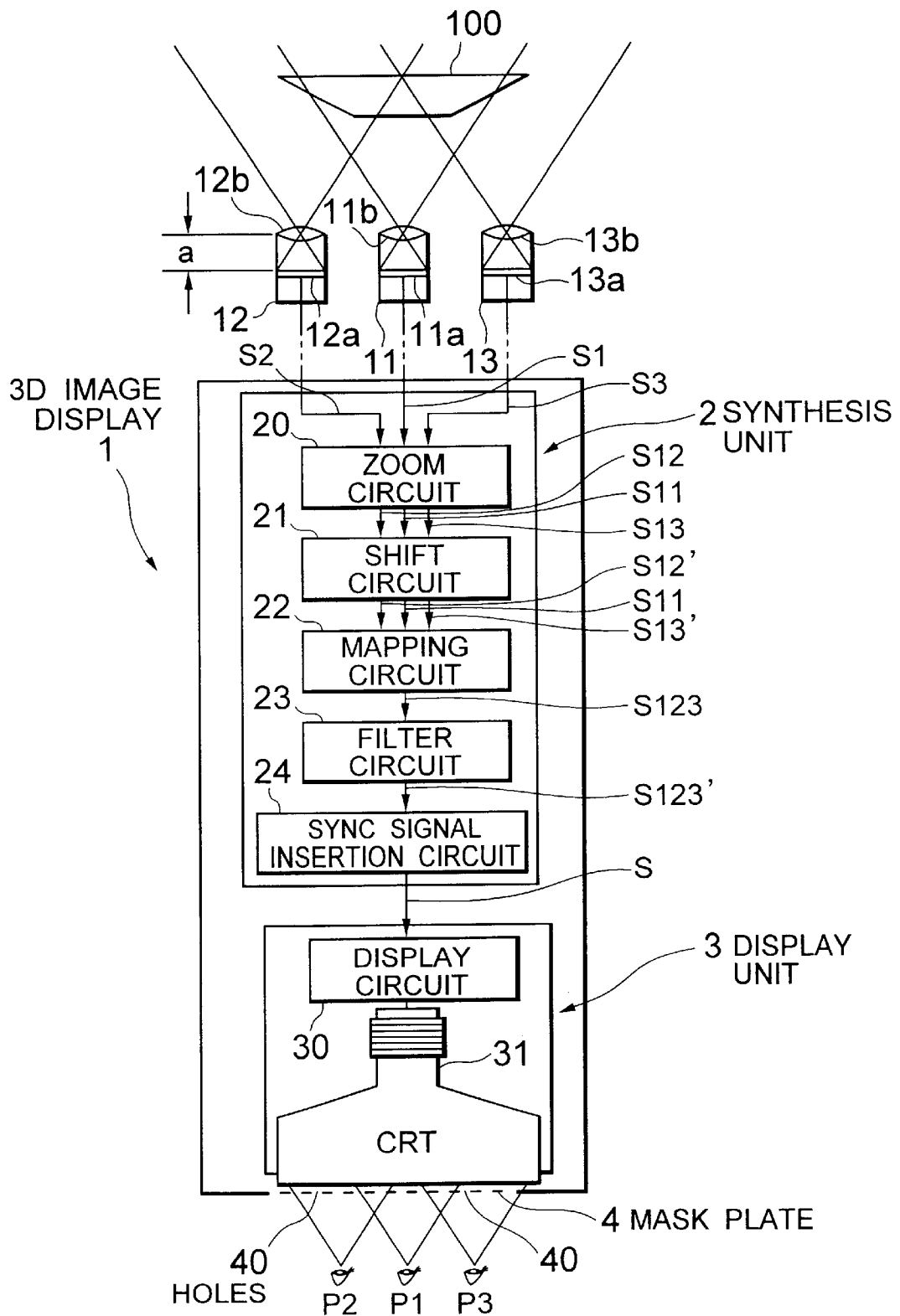
FIG. 1 is a block diagram of a three-dimensional display according to the present invention.

FIG. 1 is a block diagram of a three-dimensional display according to the present invention. In FIG. 1, reference numeral 1 is a three-dimensional display. The three-dimensional display 1 is provided with a synthesis unit 2, a display unit 3, and a mask plate 4 serving as a mask unit.

The synthesis unit 2 combines the images S1 to S3 of an object 100 sent from a camera 11 at a reference perspective and cameras 12 and 13 at other perspectives to generate a single synthesized image S and outputs this synthesized image S to the display unit 3.

Specifically, the synthesis unit 2 is provided with a zoom circuit 20 serving as a zoom unit, a shift circuit 21 serving as a shift unit, a mapping circuit 22 serving as a mapping unit, a filter circuit 23 serving as a filter unit, and a sync signal insertion circuit 24.

The zoom circuit 20 enlarges or reduces the three types of images S1 to S3 from the cameras 11 to 13 of the different perspectives.

Figure 2:
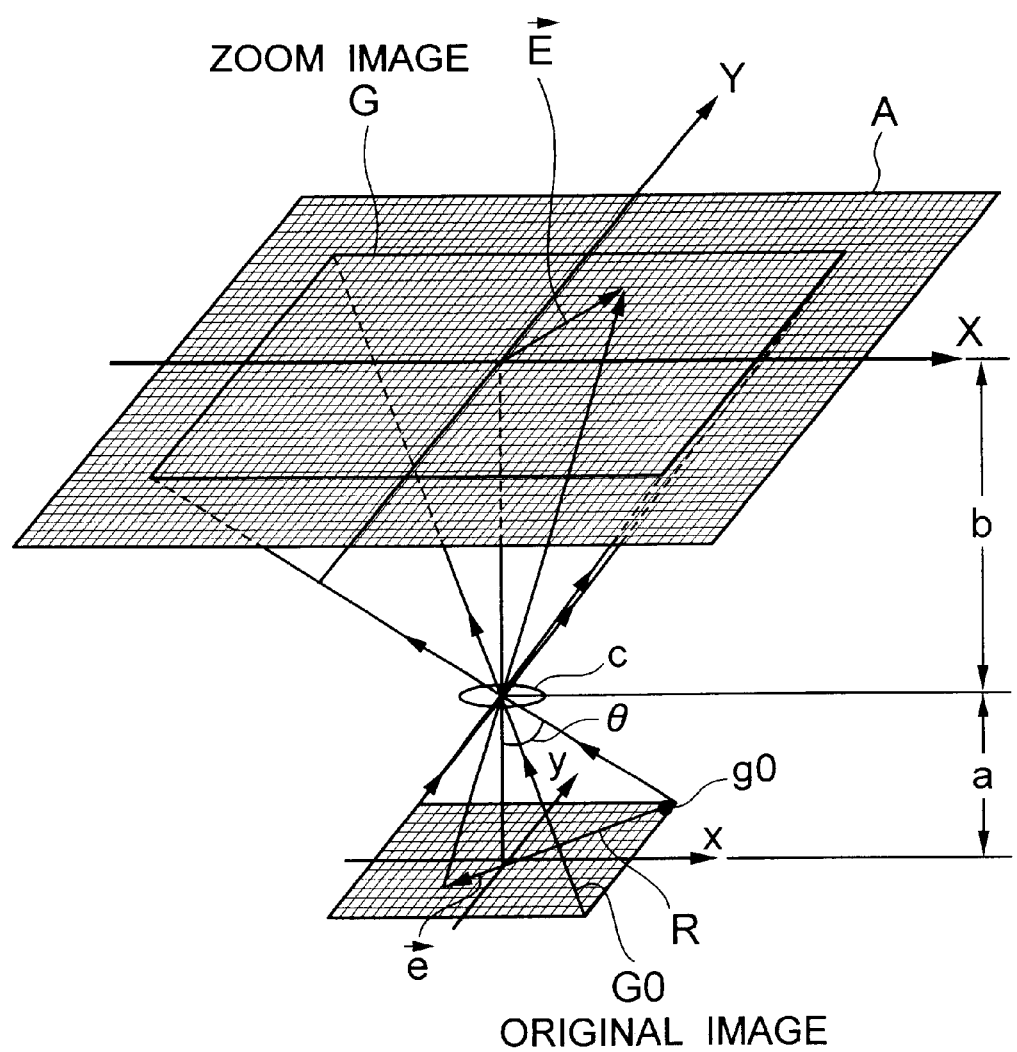
FIG. 2 is a perspective view for explaining the function of a zoom circuit.

FIG. 2 is a perspective view for explaining the function of the zoom circuit 20.

In FIG. 2, reference numeral G0 indicates any of the images S1, S2, and S3, i.e., original images, from the cameras 11, 12, and 13, with pixel arrays corresponding to the CCD element arrays of the image sensors 11a,12a, and 13a (see FIG. 1) of the cameras 11, 12, and 13. Further, the distance a is set to be equal to the distance between the centers of the lenses 11b, 12b, and 13b of the cameras 11, 12, and 13 and the centers of the image sensors 11a, 12a, and 13a. The magnification factor b is a value freely set by the user.

Further, reference symbol A shows a virtual plane facing the original image G0 with its center registered with the center of the original image. The number of pixels of the virtual plane A is set to be equal to the number of pixels of the display screen of the later explained CRT 31 (see FIG. 1). The X-directional width and Y-directional width are also set to be equal to the X-directional width and Y-directional width of the CRT 31.

The zoom circuit 20 performs the operation of the following formula (1) to project on to the virtual plane A a zoom vector E of a vector e showing any pixel of the original image G0:

$$\text{Zoom vector } E = -(\text{vector } e) \cdot b/a \qquad (1)$$

The zoom circuit 20 performs the operation of above formula (1) on all pixels on the original image G0 to project the zoom image G of the original image G0 on the virtual plane A. Further, the zoom circuit 20, as shown in FIG. 1, outputs an image S11 of the virtual plane A, comprised of the projected zoom image G corresponding to an original image G0 of the image S1 of the camera 11, and the images S12 and S13 of the virtual plane A, comprised of the projected zoom images G corresponding to original images G0 of the images S2 and S3 of the cameras 12 and 13, to the shift circuit 21.

The shift circuit 21 shifts the zoom images G of the cameras 12 and 13 from the image G of the camera 11 of the reference perspective.

Specifically, it functions to shift the zoom images G in the virtual plane A of the images S12 and S13 based on the offset of the camera 12 and camera 13 from the camera 11.

Figure 3:
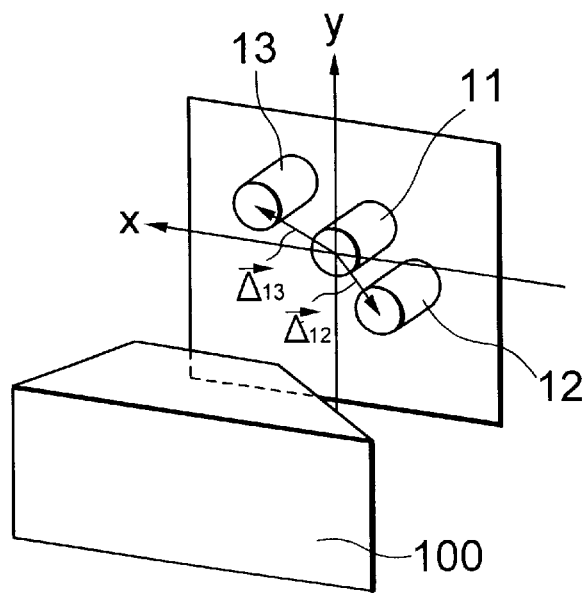
FIG. 3 is a perspective view of the relationship of the arrangement of the cameras.

FIG. 3 is a perspective view of the relative arrangement of the cameras 11 to 13.

As shown in FIG. 3, if considering the x-y plane facing the object 100 and centered on the camera 11, it is possible to express the positions of the camera 12 and the camera 13 by the vector Δ12 and vector Δ13.

The shift circuit 21 is provided with a memory (not shown). The memory stores the vector δ12 and vector δ13 obtained by reducing the vector Δ12 and vector Δ13 by exactly predetermined amounts.

When receiving the image S11 from the zoom circuit 20 as input, the shift circuit 21 outputs the image S11 to the mapping circuit 22 as it is. When receiving the images S12 and S13 as input, however, the shift circuit 21 prepares an image S12' obtained by shifting the zoom image G in the virtual plane A of the image S12 by exactly the vector δ12, prepares an image S13' obtained by shifting the zoom image G in the virtual plane A of the image S13 by exactly the vector δ13, and outputs these images S12' and S13' to the mapping circuit 22.

Figure 4:
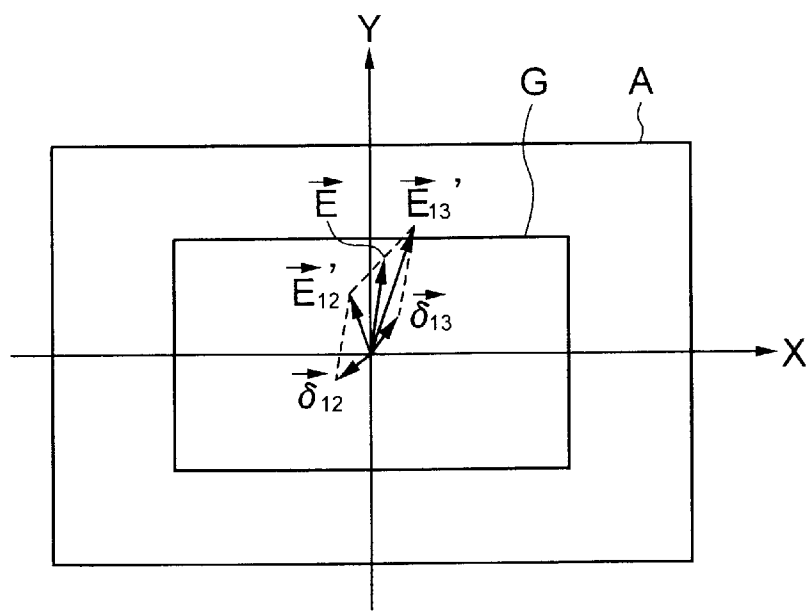
FIG. 4 is a vector diagram of the state of shifting a zoom image.

FIG. 4 is a vector diagram of the state of shift of a zoom image G.

As shown in FIG. 4, the shift circuit 21 performs the operations of the following formulas (2) and (3) to shift the zoom vectors E showing the zoom images G of the images S12 and S13 by exactly the vectors δ12 and δ13 and thereby generate the shift zoom vectors E12' and E13':

$$\text{Shift zoom vector } E12' = \text{zoom vector } E + \text{vector } δ12 \qquad (2)$$

$$\text{Shift zoom vector } E13' = \text{zoom vector } E + \text{vector } δ13 \qquad (3)$$

Figure 5A:
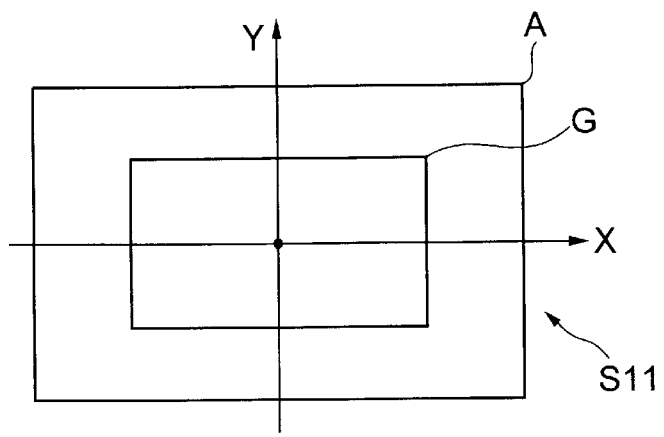
Figure 5B:
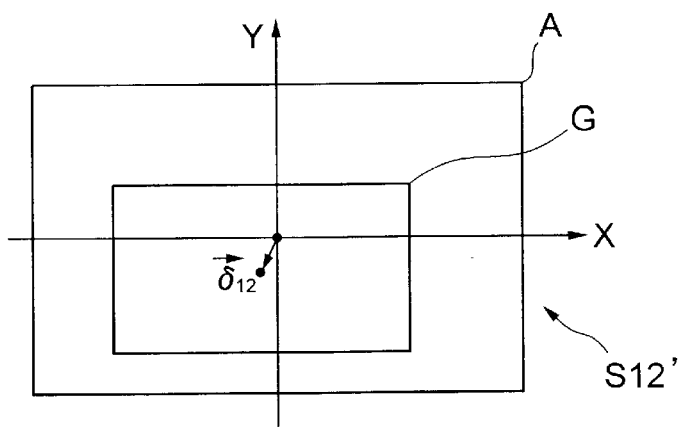
Figure 5C:
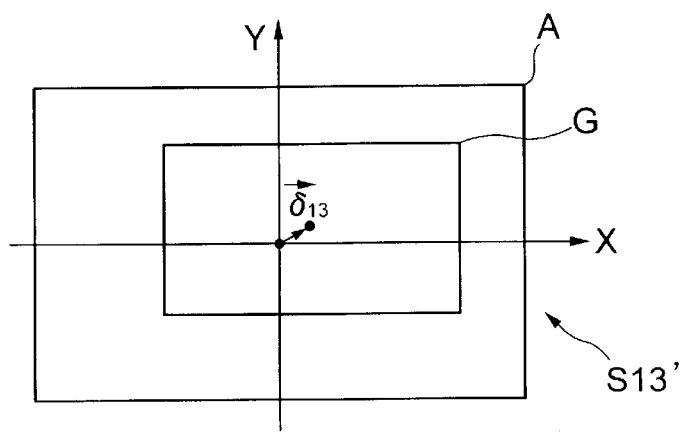

As a result, as shown in FIG. 5a, the reference zoom image G of the image S11 is positioned at the center of the virtual plane A. Further, by performing the operations of formulas (2) and (3) on all pixels of the zoom images G of the images S12 and S13, the zoom image G of the image S12 is shifted from the center of the virtual plane A in the direction of the vector δ12 as shown in FIG. 5b to generate the image S12' while the zoom image G of the image S13 is shifted in the vector δ13 direction as shown in FIG. 5c to generate the image S13'. Further, as shown in FIG. 1, these images S12' and S13' are output to the mapping circuit 22 along with the image S11.

The mapping circuit 22 maps the reference zoom image G shown by the image S11 and the two types of shift zoom images G shown by the images S12' and S13' as they are in a table of the same configuration as the virtual plane A to form the synthesized image S123.

Figure 6:
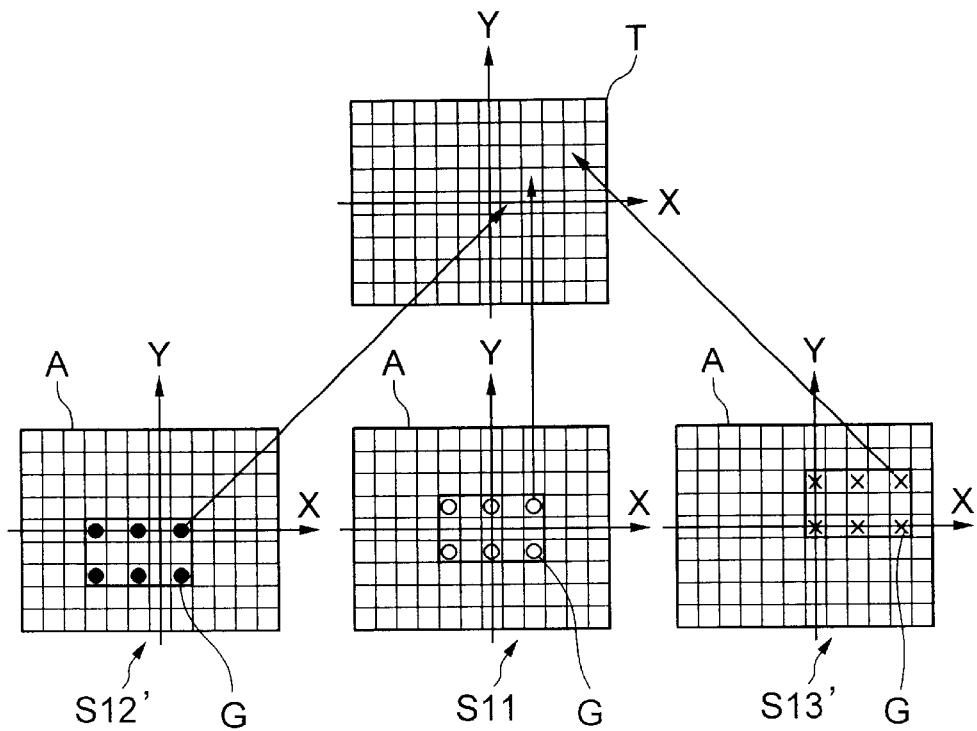
FIG. 6 is a plan view for explaining a mapping function of a mapping circuit.

FIG. 6 is a plan view for explaining the mapping function of the mapping circuit 22.

In FIG. 6, to facilitate understanding, the X-coordinate and Y-coordinate of the virtual plane A and table T are made "13" and "9", that is, the resolution of the CRT 31 is made "117", the x-coordinate and y-coordinate of an original image G0 are made "3" and "2", that is, the resolutions of the image sensors 11a to 13a (see FIG. 1) are made "6", and the pixels corresponding to the original images G0 in the zoom images G of the images S11, S12', and S13' are shown by the white circles, black circles, and x marks.

The mapping circuit 22, as shown in FIG. 6, sets the X-Y coordinate axes in the table T the same as the virtual plane A. Further, the mapping circuit 22 first maps the pixels of the reference zoom image G of the image S11 shown by the white circles at the corresponding coordinates of the table T. Suitably thereafter, it maps the pixels of the zoom images G of the images S12' and S13' shown by the black circles and x marks at the corresponding coordinates of the table T.

Here, depending on the values of the shift vectors δ12 and δ13, part of the zoom image G of the image S12' is superimposed on the zoom image G of the image S11 mapped earlier, and part of the zoom image G of the image S13' is superimposed on the zoom image G of the image S12' mapped earlier. In this case, the mapping circuit 22 leaves the pixels of the previously mapped image and does not map the later pixels.

Figure 7:
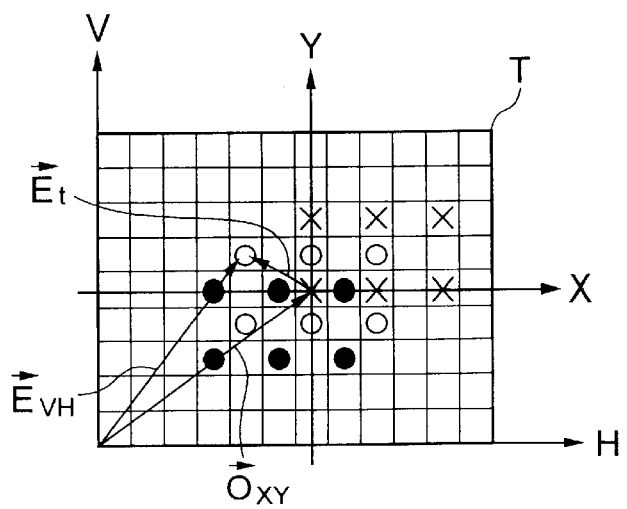
FIG. 7 is a plan view of the state of mapping zoom images on a table T.

FIG. 7 is a plan view of the state of mapping the zoom images G in the table T.

The mapping circuit 22 functions to convert the coordinates of the pixels mapped in the table T.

That is, Et is a vector of a pixel in the X-Y coordinate system of the table T shown in FIG. 7. The coordinates of the vector Et are converted to V-H coordinates having the pixel at the bottom left end of the table T as an origin.

Specifically, the vector $O_{XY}$ from the origin of the V-H coordinate system to the origin of the X-Y coordinate system is set and the vector $E_{VH}$ of a pixel in the V-H coordinate system calculated by the following formula (4):

$$\text{Vector } E_{VH} = \text{vector } Et + \text{vector } O_{XY} \qquad (4)$$

Here, the vector Et of a pixel of a white circle, that is, obtained by the camera 11, of the reference zoom image G is shown by the above formula (1), while the vectors Et of the pixels of a black circle and x mark, that is, obtained by the cameras 12 and 13, of the zoom images G, are shown by the formulas (2) and (3), so the vector $E_{VH}$ of the V-H coordinate system showing a white circle pixel is shown by the following formula (5), while the vectors $E_{VH}$ of the V-H coordinate system showing black circle and x mark pixels are shown by the following formulas (6) and (7):

$$\text{Vector } E_{VH} = -(\text{vector } e) \cdot b/a + \text{vector } O_{XY} \qquad (5)$$

$$\text{Vector } E_{VH} = -(\text{vector } e) \cdot b/a + \text{vector } \delta 12 + \text{vector } O_{XY} \qquad (6)$$

$$\text{Vector} E_{VH} = -(\text{vector } e) \cdot b/a + \text{vector } \delta 13 + \text{vector } O_{XY} \qquad (7)$$

The mapping circuit 22 outputs the table T prepared in this way and perspective data D showing which pixels of the coordinate systems show which pixels of the zoom image G among the images S11, S12', and S13' to the filter circuit 23 as the synthesized image S123 as shown in FIG. 1.

The filter circuit 23 has a filter function of eliminating predetermined pixels among the pixels of the table T shown by the synthesized image data signal S123 from the mapping circuit 22.

Here, the structure of the mask plate 4 will be explained to facilitate understanding of the filter function of the filter circuit 23.

Figure 8:
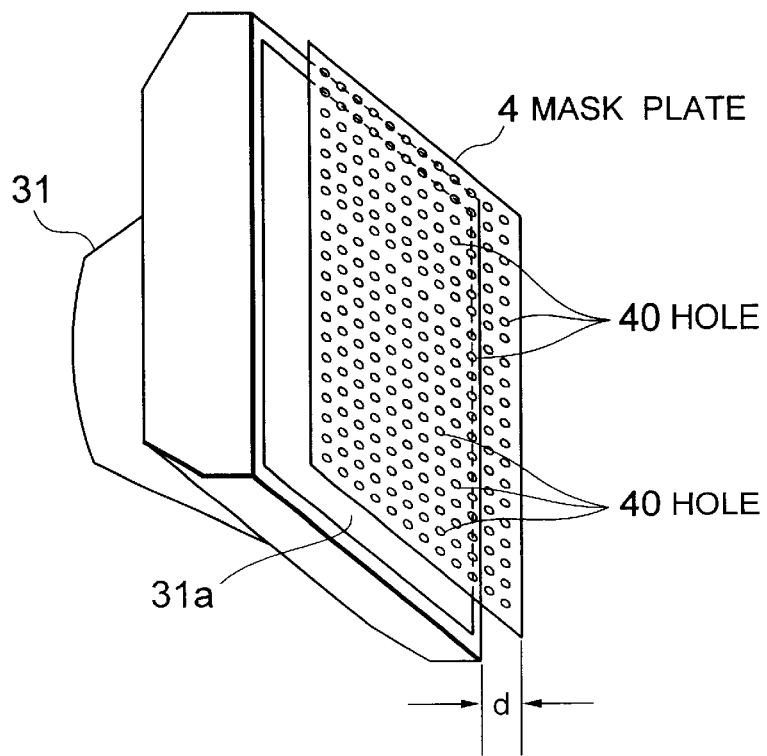
FIG. 8 is a perspective view of the structure of a mask plate.

FIG. 8 is a perspective view of the structure of the mask plate 4.

As shown in FIG. 8, the mask plate 4 is a thin sheet set larger than the display screen 31a of the CRT 31 and is placed at a distance d from the front surface of the display screen 31a of the CRT 31.

Further, a large number of circular holes 40 are formed in the surface of the mask plate 4.

Figure 9:
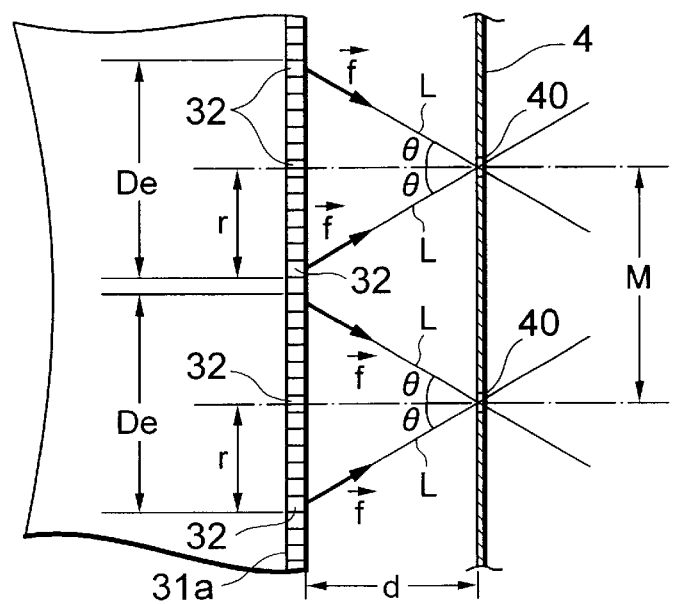
FIG. 9 is a partial sectional view of the state of formation of holes.

FIG. 9 is a partial sectional view of the state of formation of the holes 40.

As shown in FIG. 9, the holes 40 of the mask plate 4 are formed to face the pixels 32 of the display screen 31a. The diameter of the holes is set to be substantially the same as the diameter of the pixels 32.

Further, the interval M between the holes is determined as follows:

When the mask plate 4 and the display screen 31a are separated by the distance d, if only the light L with angles of incidence to holes 40 of 0° to θ° in the light L from the pixels 32 to the holes 40 is allowed to pass through the holes 40, it is possible to view only the group of pixels in the area De of the radius r shown by the following formula (8) through the holes 40:

$$r = d \cdot \tan \theta \qquad (8)$$

Further, the angle of incidence of the pixel 32 positioned at the outermost periphery of the area De is the maximum angle. This maximum angle of incidence θ, as shown in FIG. 2, is equal to the angle formed by the line connecting the pixel g0 the furthest from the center of the original image G0 and a virtual lens c intersecting with the vertical center line of the original image G0.

Therefore, if the distance from the center of the original image G0 to the pixel g0 is R, the following formula (9) stands:

$$\tan \theta = R/a \qquad (9)$$

From the above formulas (8) and (9), the following formula (10) stands:

$$r = d \cdot R/a \qquad (10)$$

Figure 20:
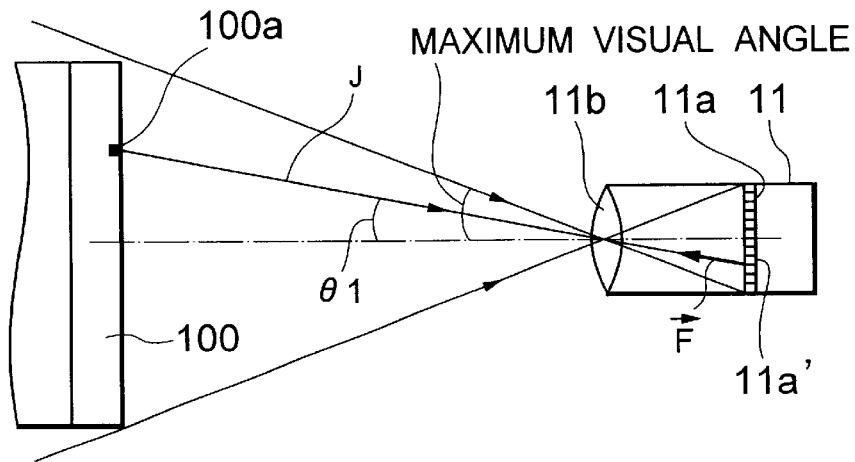
FIG. 20 is a schematic sectional view of the direction of the original light vector.

Note that the maximum angle of incidence θ of the light L from the pixel 32 positioned at the outermost periphery of the area De shown in FIG. 9 to a hole 40 is substantially equal to the maximum visual angle of the camera 11 (12, 13) (see FIG. 20).

In the present embodiment, since the light L emitted from one pixel 32 of the display screen 31a is allowed to pass through only one hole 40, the interval M between the holes 40 is set to a value so that the area De corresponding to one hole 40 does not contact the area De corresponding to another hole 40. That is, the interval M is set to be larger than "2r (=2·d·R/a)."

The filter circuit 23 compares the angle of incidence of light L from a pixel of the zoom image G to a hole 40 with respect to hole 40 when displaying that pixel on the display screen 31a and the visual angle θ1 when the camera 11 (12, 13) captures the portion of the object 100 corresponding to that pixel (see FIG. 20) and removes that pixel from the table T of the synthesized image S123 when these angles are not equal. This will be explained in more detail below.

The filter circuit 23 has a memory (not shown) storing data D1 comprised of sets of a center pixel in an area De of the radius r shown in FIG. 9 and the group of pixels in the area De.

Figure 10:
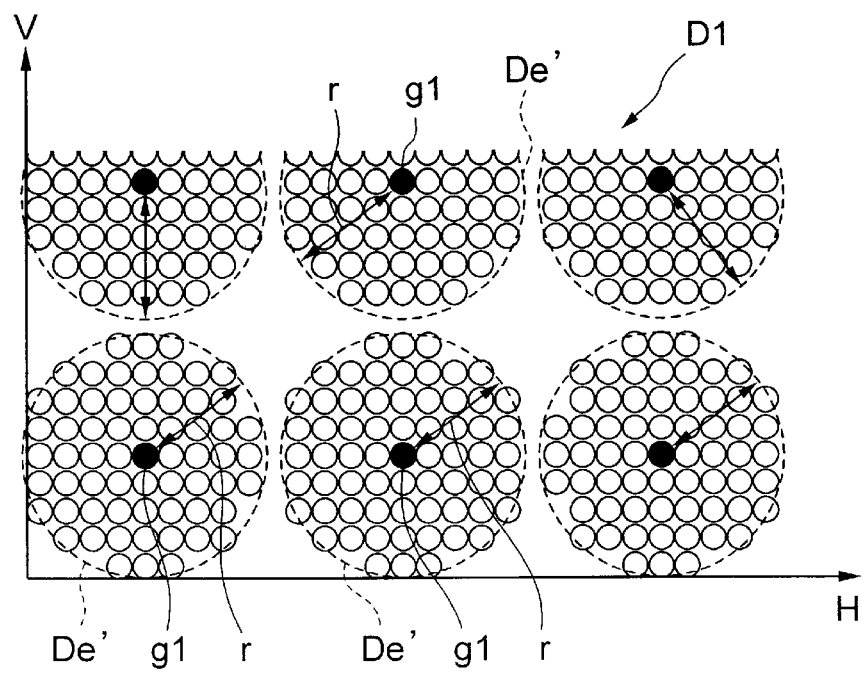
FIG. 10 is a plan view for explaining data stored in a memory of a filter circuit.

FIG. 10 is a plan view of the data D1 stored in the memory of the filter circuit 23.

The data D1 includes, corresponding to the number of holes 40, the area data De' comprised of sets of the V-H coordinates of the pixel g1 facing the hole 40 of the mask plate 4 (pixel blacked out) among the pixels of the display screen 31a of the display unit 3 and the V-H coordinates of the group of pixels present in a circular area of the above radius r from the pixel g1.

When receiving as input a synthesized image data signal S123 from the mapping circuit 22, the filter circuit 23 reads out the above data D1 from the memory. Further, it determines which area data De' a pixel of the table T shown by the synthesized image data signal S123 (that is, a pixel of the zoom image shown by a white circle etc. in FIG. 7) belongs to and specifies the V-H coordinates of the pixel g1 of the determined area data De'.

Figure 11:
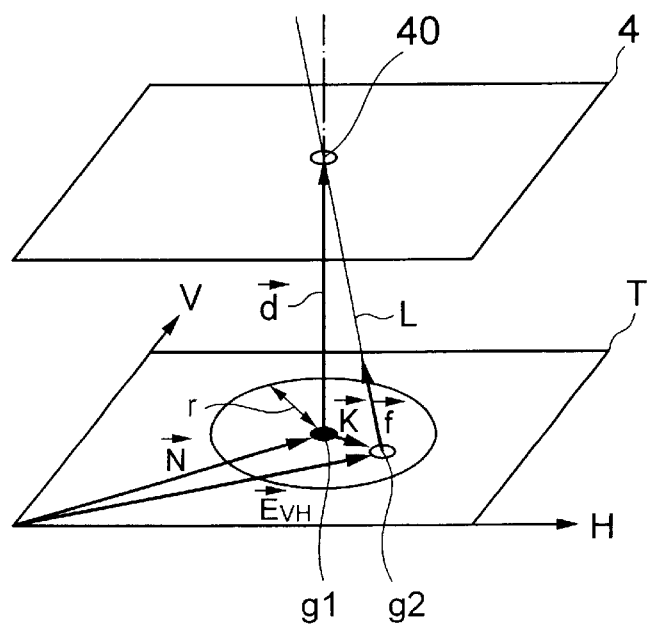
FIG. 11 is a vector diagram of the method of calculating a light vector.

FIG. 11 is a vector diagram of the method of calculation of the light vector f.

As shown in FIG. 11, a pixel g1 facing a hole 40 of the mask plate 4 and specified by the data D1 is expressed as a vector N in the V-H coordinate system. Any pixel g2 of the table T is expressed by the vector $E_{VH}$ in the V-H coordinate system. Therefore, the vector k is shown by the following formula (11):

Vector $k$=vector $E_{VH}$–vector $N$     (11)

Further, the light vector f of the light L incident from the pixel g2 to the hole 40 is expressed by the following formula (12) considering the above formula (11):

$$\text{Light vector} = \text{vector } d - \text{vector } k \quad (12)$$
$$= \text{vector } d - \text{vector } E_{VH} + \text{vector } N$$

Note that the vector d is a vertical vector of the same magnitude as the distance d.

Next, the filter circuit 23 calculates the original light vector F of the pixel g2' corresponding to the pixel g2 in the pixels of the original image G0.

Figure 12:
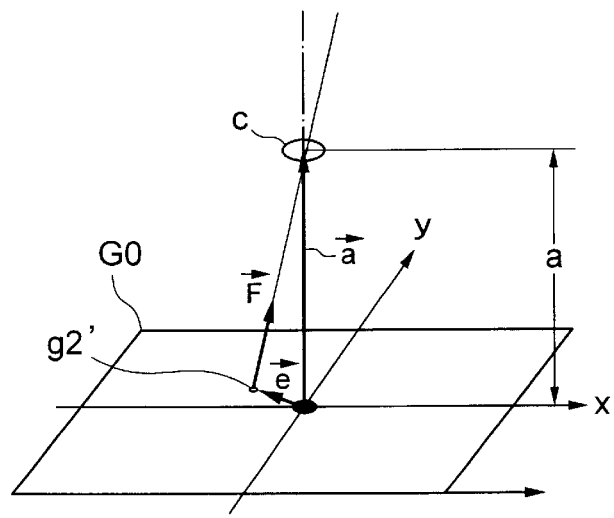
FIG. 12 is a vector diagram of an original light vector.

That is, as shown in FIG. 12, when the straight line vector from the pixel g2' of the original image G0 to the virtual lens c is the original light vector F and the vertical vector of the magnitude a is the vector a, the original light vector F is expressed by the following formula (13):

$$\text{Original light vector } F = \text{vector } a - \text{vector } e \quad (13)$$

Further, the filter circuit 23 judges which of the cameras 11 to 13 took the pixel g2 of the V-H coordinate system based on the perspective data D of the synthesized image data signal S123.

When the pixel g2 was taken by the camera 11, the original light vector F is expressed by the following formula (14) based on the above formula (5), so the filter circuit 23 calculates the original light vector F of the pixel g2 using formula (14):

$$\text{Original light vector } F = \text{vector } a + (\text{vector } E_{VH} - \text{vector } O_{XY}) \cdot a/b \quad (14)$$

Further, when the pixel g2 was taken by the camera 12 or 13, the original light vector F is expressed by the following formula (15) or (16) based on the above formula (6) or (7), so the filter circuit 23 calculates the original light vector F of the pixel g2 using the formula (15) or (16):

$$\text{Original light vector } F = \text{vector } a + (\text{vector } E_{VH} - \text{vector } O_{XY} - \text{vector } \delta 12) \cdot a/b \quad (15)$$

$$\text{Original light beam vector } F = \text{vector } a + (\text{vector } E_{VH} - \text{vector } O_{XY} - \text{vector } \delta 13) a/b \quad (16)$$

Finally, the filter circuit 23 finds the outer product of the above light vector f and original light vector F, that is, the vector P, based on the following formula (17) and, when the size of the vector P is not "0", removes the pixel g2 from the table T:

$$\text{Vector } P = \text{vector } f \times \text{vector } F \quad (17)$$

That is, the filter circuit 23 functions to remove those of the pixels, present in the area within the radius r from the center pixel g1 shown in FIG. 11 and viewed through the holes 40, when the direction of the original light vector F does not match the direction of the light vector f (that is, pixels which should not be viewed through the holes 40).

The filter circuit 23, as shown in FIG. 1, outputs the synthesized image S123' showing the table T from which the unnecessary pixels have been removed in this way to the sync signal insertion circuit 24.

The sync signal insertion circuit 24 inserts a horizontal sync signal and vertical sync signal into the synthesized image S123' from the filter circuit 23 and outputs the synthesized image S to the display unit 3 to display the image.

The sync signal insertion circuit 24 functions to successively fetch strings of pixels parallel to the H axial direction of the table T as horizontal lines from the top to the bottom of the V-axis to form frames of the synthesized image S and successively output the frames of the synthesized image S to the display unit 3.

Figure 13:
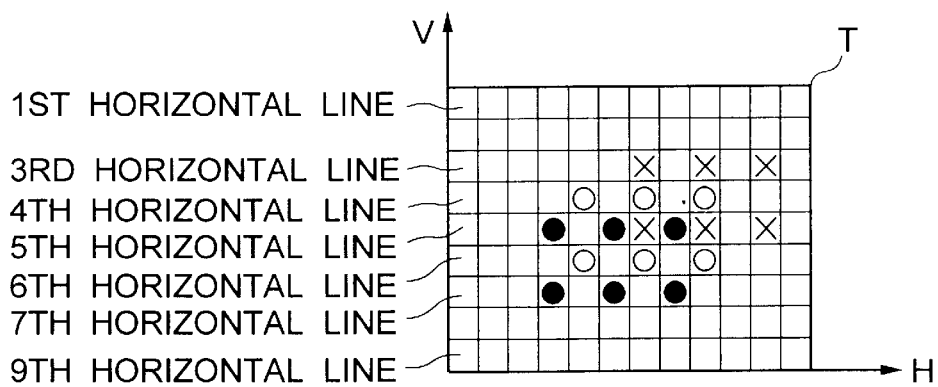
FIG. 13 is a plan view of horizontal lines.
Figure 14:
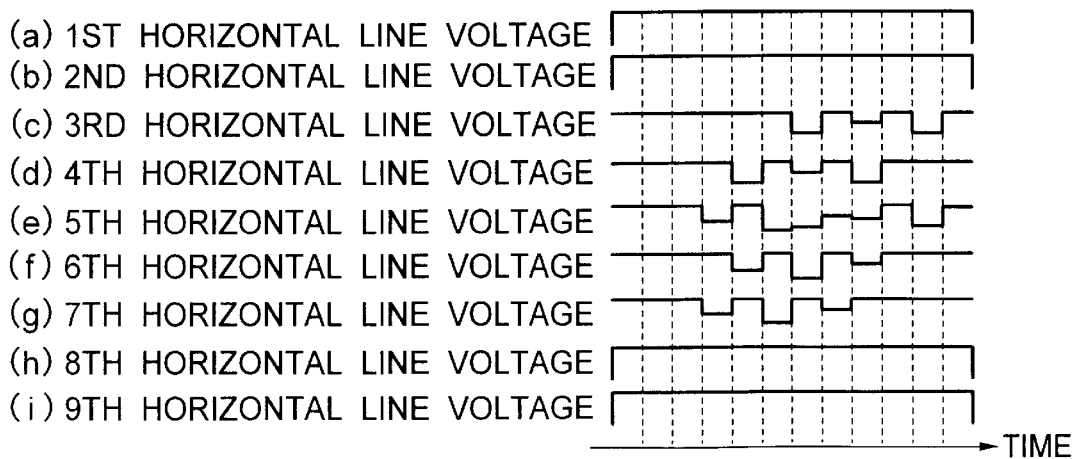
FIG. 14 is a voltage waveform diagram of the horizontal lines.
Figure 15:
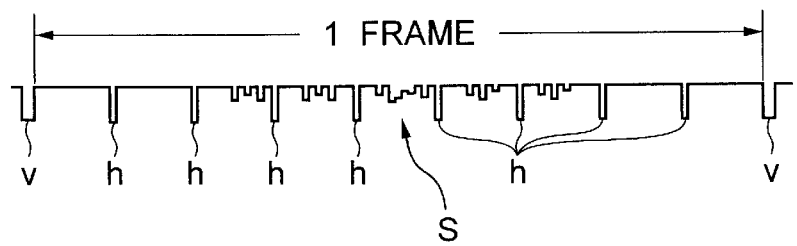
FIG. 15 is a waveform diagram of a synthesized image generated by a sync signal insertion circuit.

FIG. 13 to FIG. 15 are explanatory views of the method of producing the synthesized image S by the sync signal insertion circuit 24. Note that to facilitate understanding, the method of production of the synthesized image S is based on the table T shown in FIG. 7.

As shown in FIG. 13, the third horizontal line to the seventh horizontal line include the pixels showing the zoom images G captured by the cameras 11 to 13 (white circles, black circles, and x marks). Therefore, if the portions of the image without these pixels are made the maximum voltage value, the voltage signals of the first horizontal line to the ninth horizontal line become the voltage waveforms shown in FIG. 14.

The sync signal insertion circuit 24, as shown in FIG. 15, connects the first horizontal line to the ninth horizontal line produced in this way, inserts the vertical sync signal v between the front end of the first horizontal line and the rear end of the ninth horizontal line, and inserts the horizontal sync signal h at the horizontal lines to produce the synthesized signal which it outputs to the display unit 3.

The display unit 3 has a display circuit 30 and CRT 31 as shown in FIG. 1.

The display circuit 30 is a known circuit which controls the intensity and direction of the electron beams emitted from the electron gun of the CRT 31 based on the horizontal sync signal h and vertical sync signal v of the synthesized image S and is used for television receivers, etc.

The CRT 31 is a known device for making the electron gun horizontally scan in accordance with the horizontal line voltage signal during the horizontal sync signal h and making it vertically scan based on the vertical sync signal v. As explained above, the number of pixels 32 of the display screen 31a of the CRT 31 is set to be substantially equal to the number of pixels of the table T.

Next, the operation of the three-dimensional display 1 of the present embodiment will be explained.

Figures 16A, 16B, 16C:
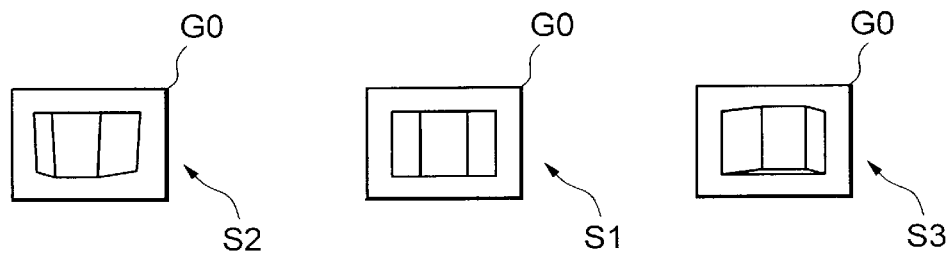

As shown in FIG. 1, when capturing a three-dimensional object 100 having a trapezoidal sectional shape by the three cameras 11 to 13 in the relative arrangement shown in FIG. 3, the camera 11 is positioned right in front of the object 100, the camera 12 is positioned looking up at the object 100 from the bottom right, and the camera 13 is positioned looking down at the object 100 from the top right. Therefore, the images S1, S2, and S3 of the original images G0 as shown by FIGS. 16a, 16b, and 16c are output from the image sensors 11a, 12a, and 13a of the cameras 11, 12, and 13 to the zoom circuit 20 of the synthesis unit 2.

This being the case, the original images G0 of the images S1 to S3 are enlarged b/a-fold as shown in FIG. 2 in the zoom circuit 20, then the images S11 to S13 of the virtual plane A on which the zoom images G are projected are output to the shift circuit 21.

Figures 17A, 17B, 17C:
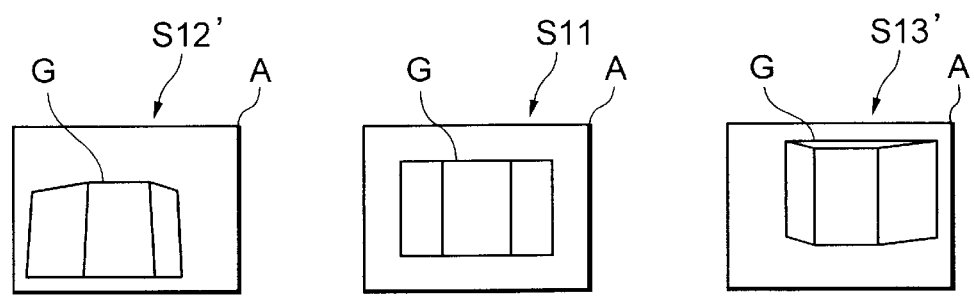

When the image S11 is input to the shift circuit 21, as shown in FIG. 17b, the image S11 is output as it is to the mapping circuit 22. Further, when the image S12 is input to the shift circuit 21, as shown in FIG. 17a, the image S12' obtained by shifting the zoom image G in the virtual plane A of the image S12 by exactly the vector δ12 is generated. Further, when the image S13 is input to the shift circuit 21, as shown in FIG. 17c, the image S13' obtained by shifting the zoom image G in the virtual plane A of the image S13 by exactly the vector δ13 is generated. Further, these images S12' and S13' are output from the shift circuit 21 to the mapping circuit 22.

Figure 18:
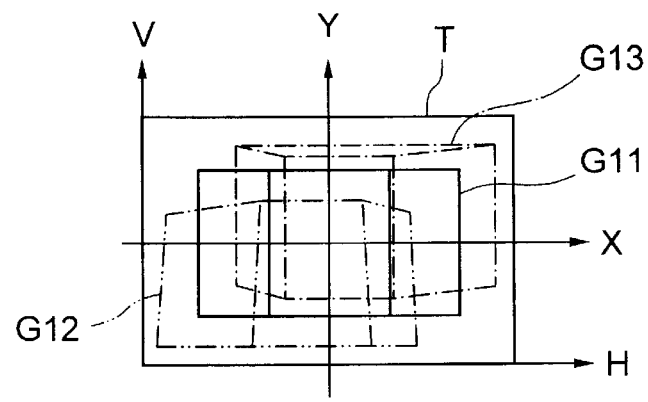
FIG. 18 is a plan view of a synthesized image obtained by combining shifted zoom images.

When the images S11, S12', and S13' are input to the mapping circuit 22, the virtual plane A of the image S11 is mapped in the table T, then the pixels of the image S11 overlapping with pixels of the zoom image G are removed and the virtual planes A of the images S12' and S13' are mapped in the table T. Specifically, as shown in FIG. 18, the zoom image G11 of the image S11 shown by the solid line, the zoom image G12 of the image S12' shown by the two-dot chain line, and the zoom image G13 of the image S13' shown by the one-dot chain line are mapped together in the single table T. Further, the coordinates of the table T are converted from the X-Y coordinates to V-H coordinates, then the table T and the perspective data D are output to the filter circuit 23 as the synthesized image S123.

When the synthesized image S123 is input to the filter circuit 23, a center pixel g1 facing a hole 40 of the mask plate 4 among the pixels of the zoom image G at the table T is specified. Further, the pixels where the direction of the original light vector F and the direction of the light vector f do not match among the pixels present in the area De within the radius r from the center pixel g1 (see FIG. 9 to FIG. 11) which would be viewed through the holes 40 are removed from the zoom image G of the table T.

The table T from which the unnecessary pixels have been removed in this way is output from the filter circuit 23 as the synthesized image S123' to the sync signal insertion circuit 24.

If the image S123' is input to the sync signal insertion circuit 24, the horizontal lines of the strings of pixels parallel to the H-axial direction of the table T in which the image S123' is shown are fetched from the top to bottom of the V-axis in that order. The synthesized image S (see FIG. 15) obtained by inserting the horizontal sync signal h into the connection portion of the vertical sync signal v and horizontal line signals is output to the display unit 3.

Due to this, the CRT 31 of the display unit 3 is controlled by the display circuit 30, the pixels 32 provided at the display screen 31a of the CRT 31 emit light, and an image the same as the image shown by the table T shown in FIG. 18 is displayed on the display screen 31a.

As a result, the user can view the following image through the mask plate 4.

Figure 19:
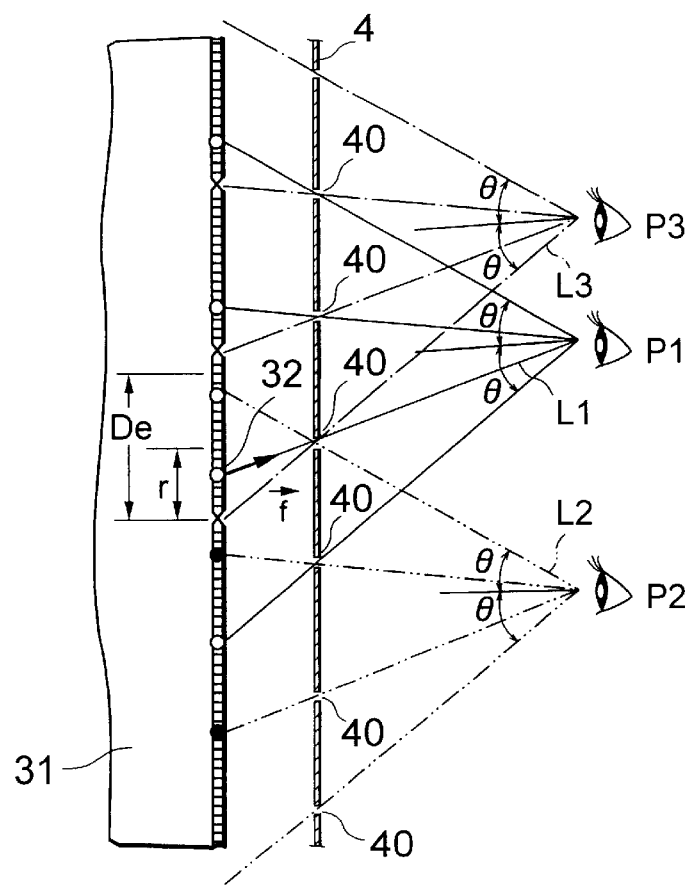
FIG. 19 is a sectional view of light focused at different viewing perspectives.

As shown in FIG. 19, the light L1 (solid line) emitted from a pixel 32 (white circle pixel) corresponding to a pixel of the zoom image G11 is present in the area De of a radius r from a center pixel facing a hole 40 of the mask plate 4 (see FIG. 9 to FIG. 11), so will always pass through the hole 40. Further, the direction of the light vector f of the pixel 32 matches the direction of the original light vector F (see FIG. 12). Further, as shown in FIG. 20, if the light J from a portion 100a of the object 100 captured at the visual angle θ1 within the maximum visual angle of the camera 11 strikes the CCD element 11a' of the image sensor 11a generating the pixel of the original image G0 corresponding to that pixel 32, the direction of the original light vector F substantially matches the direction of the light J. Therefore, as shown in FIG. 19, all of the light L1 emitted from all of the pixels 32 corresponding to the pixels of the zoom image G11 pass through the holes 40 and are focused at the viewing perspective P1 corresponding to the camera 11.

Similarly, all of the light L2 and L3 (two-dot chain line and one-dot chain line, respectively) emitted from all of the pixels 32 (black circle and x mark pixels, respectively) corresponding to the pixels of the zoom images G11 and G13 pass through the holes 40 and are focused at the viewing perspectives P2 and P3 corresponding to the cameras 12 and 13.

Figure 21:
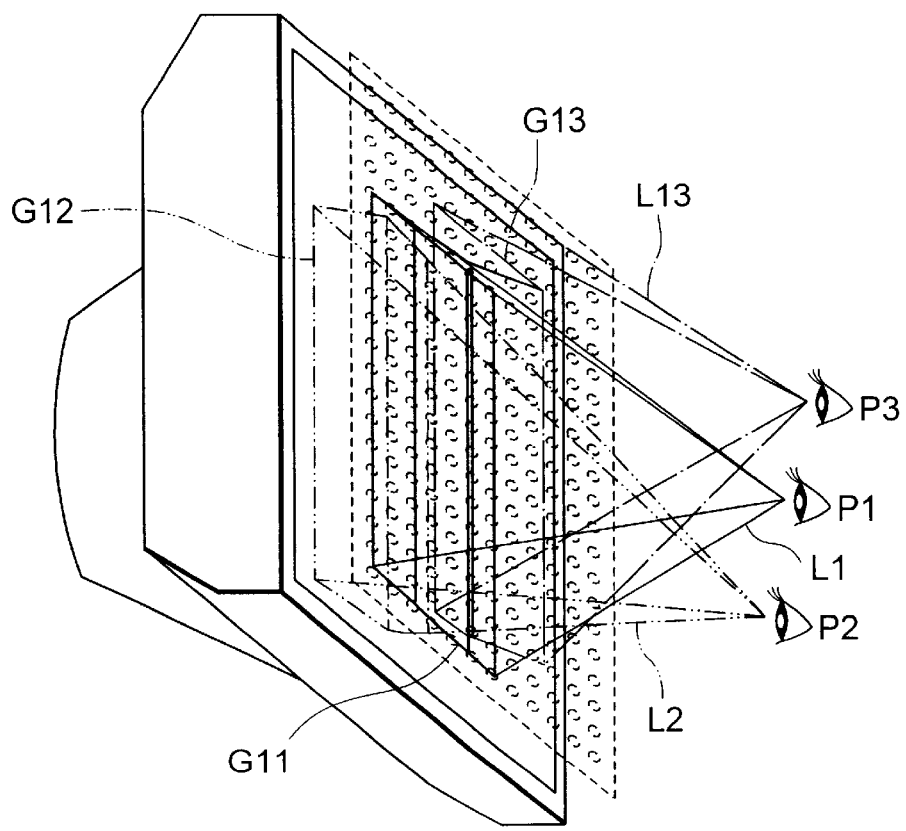
FIG. 21 is a perspective view of light focused at different viewing perspectives.

As a result, as shown in FIG. 21, by assuming a position at the viewing perspective P1, the user can view the same image as seen when viewing an object 100 from a position right in front of it, at the position of camera 11, the reference perspective. Further, by assuming a position at viewing perspective P2 or viewing perspective P3, the user can view the same image as seen when viewing the object 100 at the positions of the different perspectives, that is, the camera 12 or camera 13. Further, since the filter circuit 23 removes the pixels which should not be viewed from holes 40 of the mask plate 4, for example, at the viewing perspective P1, only the light emitted from the pixels of the zoom image G11 are viewed and the user can view a clear image G11 free of noise. It is also possible to view clear images G12 and G13 free of noise at the viewing perspectives P12 and P13.

In this way, according to the three-dimensional display 1 of the present embodiment, since it is possible to display a three-dimensional image on the CRT 31 by the simple configuration of the synthesis unit 2, the known inexpensive display unit 3, and the mask plate 4 arranged before the CRT 31, the entire structure of the three-dimensional display 1 can be simplified and the cost can be lowered. In particular, by providing a microcomputer for the synthesis unit 2 and configuring the functions of the circuits with software, the overall configuration can be further simplified and the cost further lowered.

Second Embodiment

Figure 22:
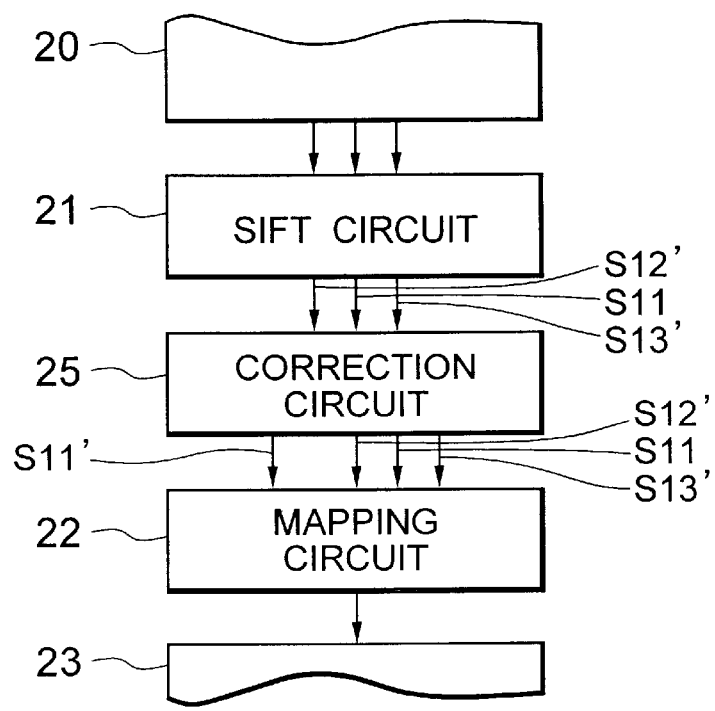
FIG. 22 is a block diagram of principal parts of a three-dimensional display according to a second embodiment of the present invention.

FIG. 22 is a block diagram of the principal parts of a three-dimensional display according to a second embodiment of the present invention.

This embodiment differs from the first embodiment by providing a correction circuit 25 serving as a correction unit between the shift circuit 21 and mapping unit 22.

The correction circuit 25 generates n−1 number of images S11' for mapping between the adjoining image S11 and image S12' and between the similarly adjoining image S11 and image S13'.

Figure 23:
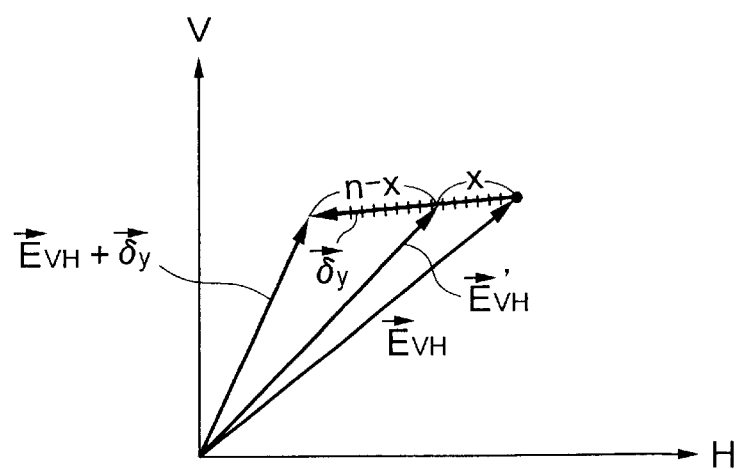
FIG. 23 is a vector diagram of the method of calculation when mapping a correction image between zoom images.

Specifically, as shown in FIG. 23, the vector obtained by shifting the vector $E_{VH}$ in the V-H coordinate system of any pixel in the zoom image G of the image S11 in the direction of the vector δy (=δ12 or δ13 is the "vector $E_{VH}$+vector δy". Therefore, the correction vector $E_{VH}'$ internally dividing these vectors to "x vs. n-x" is shown by the following equation (18):

$$\text{Correction vector } E_{VH}' = \{x \cdot (E_{VH} + \delta y) + (n-x) \cdot E_{VH}\}/n \quad (18)$$

Therefore, by making x change from 1 to n-1, it is possible to prepare n-1 number of correction vectors $E_{VH}'$.

The correction circuit 25 performs this processing to generate n-1 number of images S11' obtained by shifting the zoom image G in the image S11 by δ12 (and δ13)/n at a time in the vector δ12 (and δ13) direction and outputs the result to the mapping circuit 22 along with the images S1, S12', and S13'.

Figure 24:
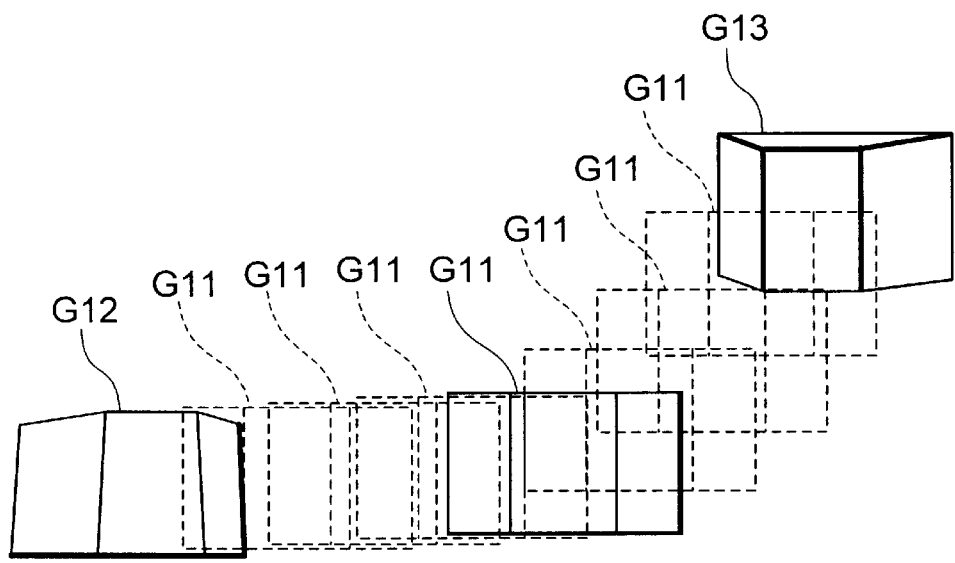
FIG. 24 is a plan view of the state of mapping a correction image between zoom images.

Due to this configuration, the display screen 31a of the CRT 31 displays the synthesized image S with n-1 number of zoom images G11 mapped between the reference zoom image G11 obtained by the camera 11 and the zoom image G12 obtained by the camera 12 and between the reference zoom image G11 and the zoom image G13 obtained by the camera 13 as shown in FIG. 24. Due to this, even when the user moves from viewing perspective P1 to P2 or P3, the image can be zoom viewed without a break and there is therefore no strange sensation. Note that the number n-1 of the corrected zoom images G11 may be freely set, but it is usually set to one.

The rest of the configuration and the actions and effects are similar to those of the above first embodiment, so explanations thereof will be omitted.

Third Embodiment

Figure 25:
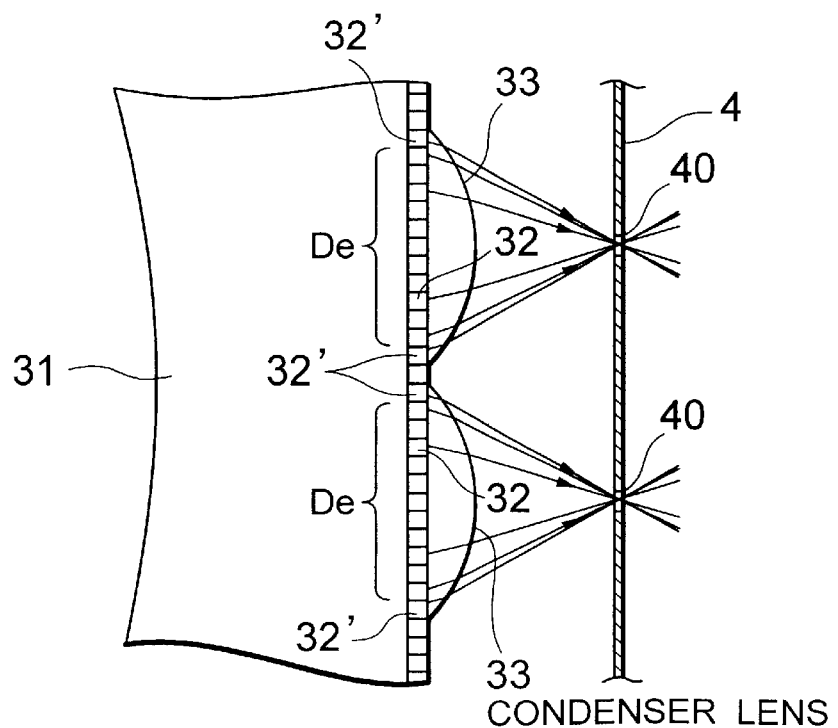
FIG. 25 is a partially enlarged view of the principal parts of a three-dimensional display according to a third embodiment of the present invention.

FIG. 25 is a partial enlarged view of the principal parts of a three-dimensional display according to a third embodiment of the present invention.

This embodiment differs from the first and second embodiments in that condenser lenses are provided to enable the image to be viewed brightly.

As shown in FIG. 25, two adjoining areas De are set so as not to contact each other. The condenser lenses 33 are attached above these areas De. The condenser lenses 33 are set to be larger than the areas De. The pixels 32 inside each area De, as well as the pixels 32' outside of each area De are covered by the condenser lenses 33.

Due to this configuration, since the light from the pixels 32 inside each area De as well as the light from the outside pixels 32' passes through the holes 40 due to the refraction action of the condenser lenses 33, the user can view a brighter image compared with the images produced with the first and second embodiments which only enable viewing of the light emitted from the pixels 32 in the areas De.

The rest of the configuration and the actions and effects are similar to those of the above first and second embodiments, so explanations thereof will be omitted.

Note that the present invention is not limited to the present embodiments. Various modifications and changes may be made within the scope of the invention.

Figure 26:
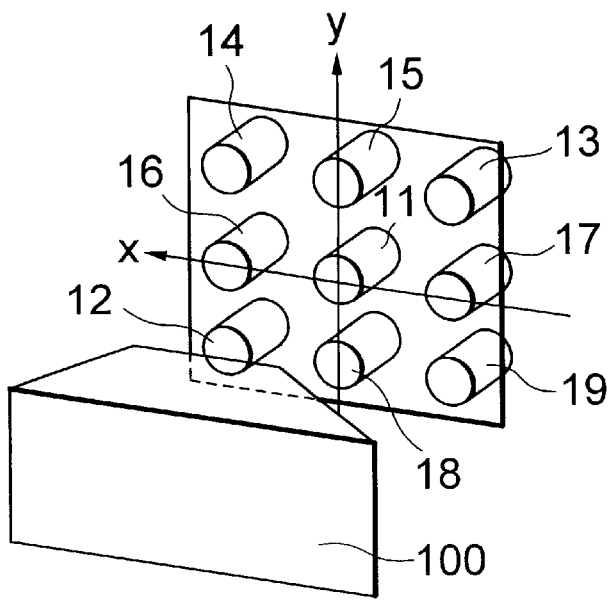
FIG. 26 is a sectional view of a first modification.

For example, in the above embodiment, an example was shown of any arrangement of three cameras 11 to 13, but when using three cameras 11 to 13, it is preferable to arrange these cameras 11 to 13 at equal intervals in the horizontal direction. Further, as shown in FIG. 26, it is possible to arrange nine cameras 11 to 19 in a grid and view the object 100 from a variety of angles.

Figure 27:
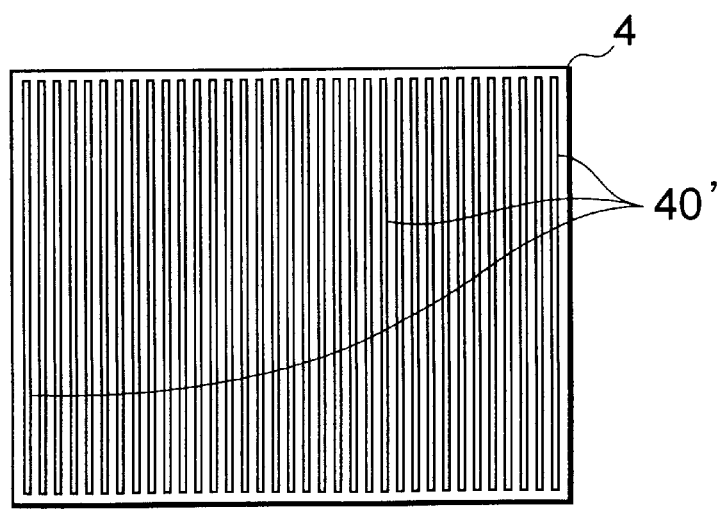
FIG. 27 is a sectional view of a second modification.

Further, in the above embodiment, a plurality of holes 40 are made in a grid in the mask plate 4, but the holes 40 may also be formed in a zigzag manner. Further, the holes 40 were made circular, but they may also be made triangular or otherwise polygonal. Further, as shown in FIG. 27, the holes of the mask plate 4 may also be formed as slit-shaped elongated holes 40'.

Figure 28:
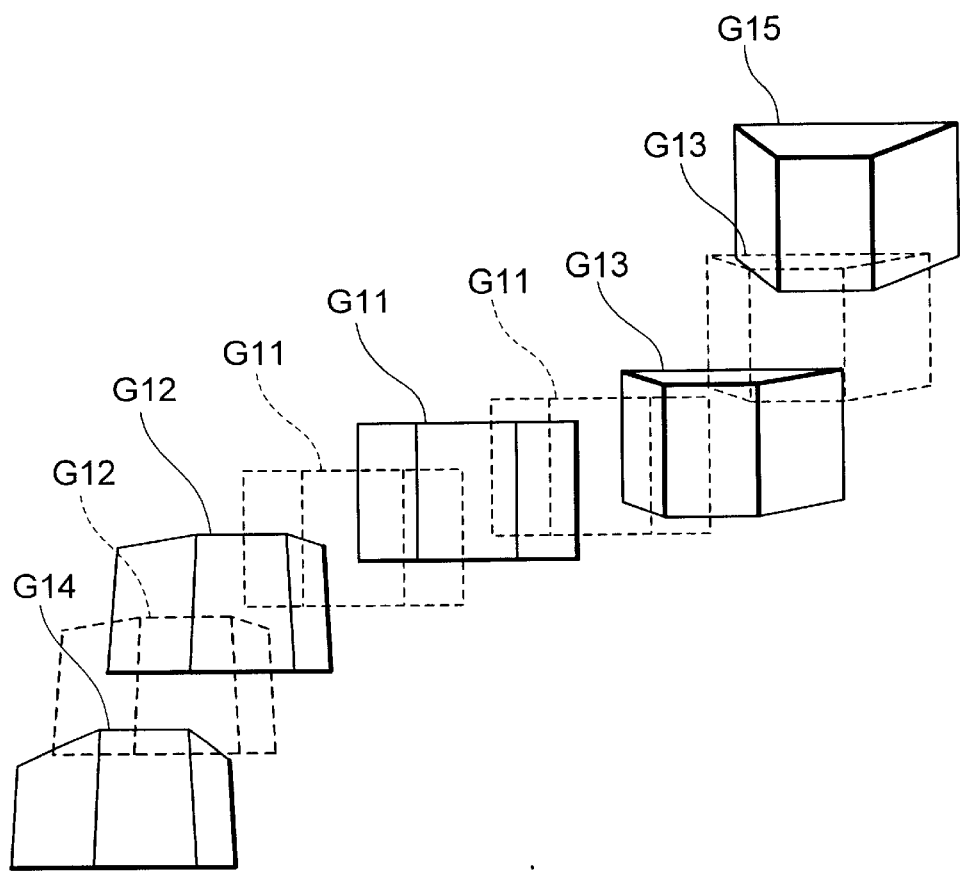
FIG. 28 is a sectional view of a third modification.

Further, in the second embodiment, three cameras 11 to 13 were used, so as shown in FIG. 24, one or more zoom images G11 were mapped between the zoom image G12 and zoom image G12 and between the zoom image G11 and zoom image G13. But, as shown in FIG. 28, when there are zoom images G14 and G15 next to the zoom images G12 and G13, it is possible to map a zoom image G12 (shown by broken lines) between the zoom image G12 and zoom image G14 or zoom image G13 or map a zoom image G13 (shown by broken lines) between the zoom image G13 and zoom image G15.

Figure 29:
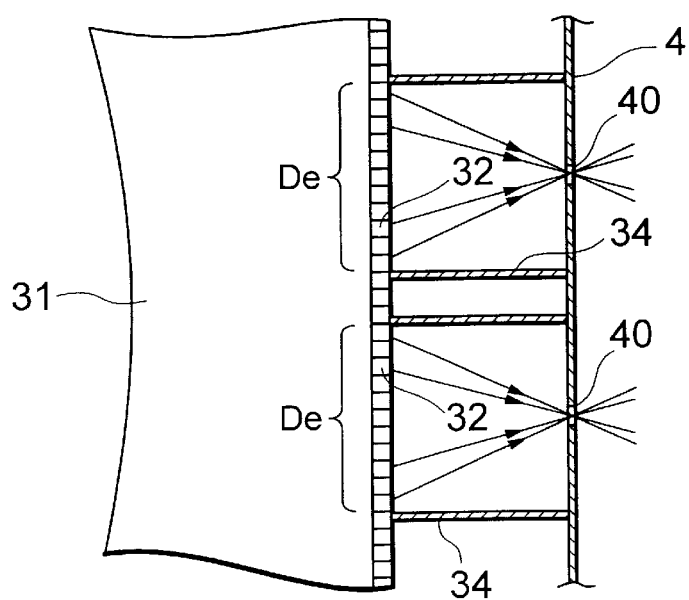
FIG. 29 is a sectional view of a fourth modification.
Figure 30:
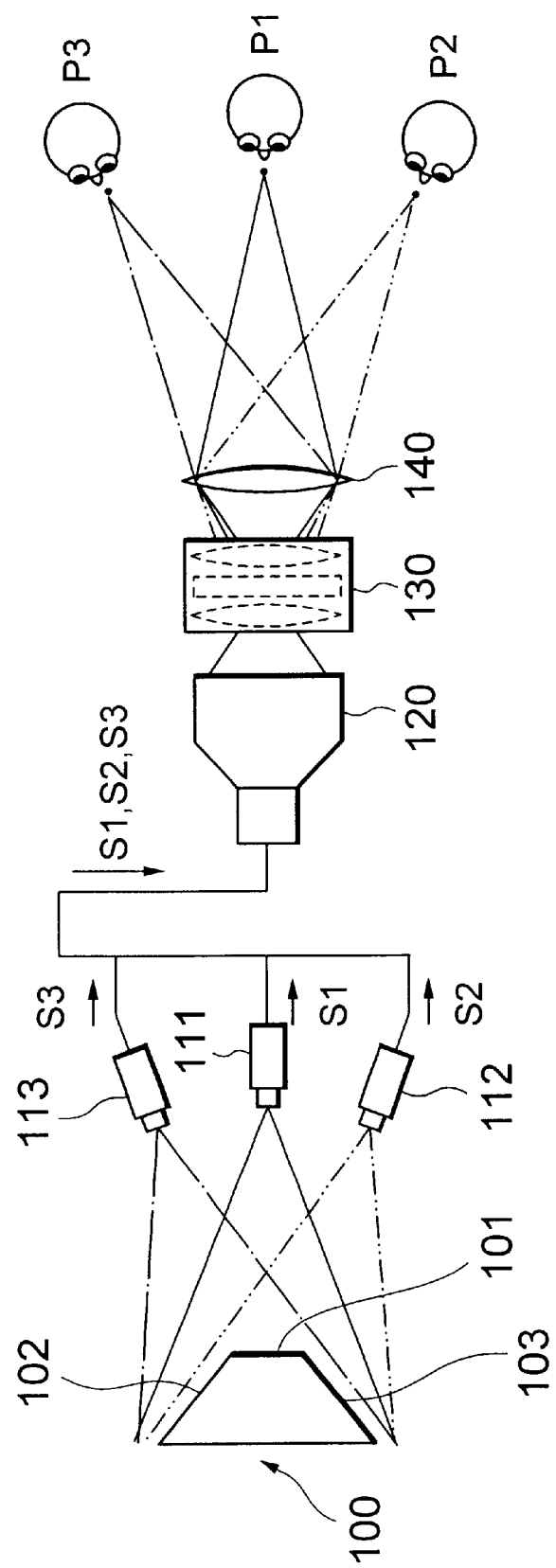
FIG. 30 is a general block diagram of an example of a conventional three-dimensional display.
Figure 31:
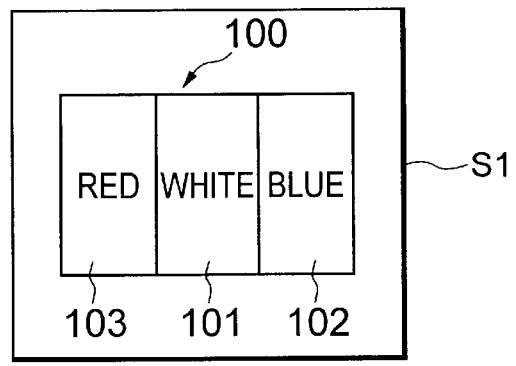
FIG. 31 is a plan view of an image of an object taken by the camera 111.
Figure 32:
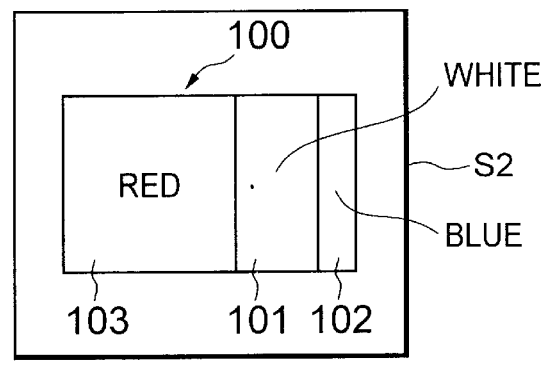
FIG. 32 is a plan view of an image of an object taken by the camera 112.
Figure 33:
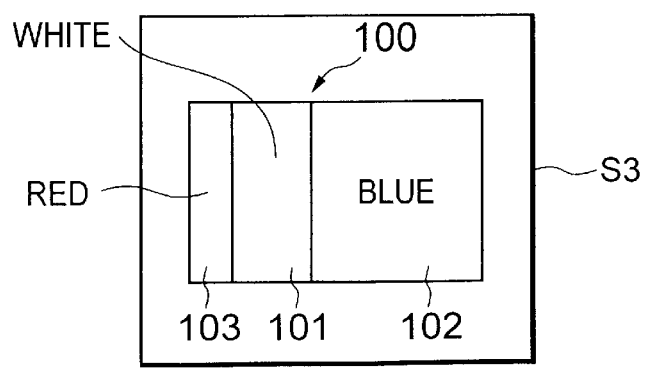
FIG. 33 is a plan view of an image of an object taken by the camera 113.

Further, as shown in FIG. 29, it is also possible to attach a cylindrical separator 34 surrounding the area De of the display screen 31a to the display screen 31a.

As explained in detail, according to the three-dimensional display of the present invention, since it is possible to view a three-dimensional image of an object by using the simple configuration of a synthesis unit, display unit, and mask unit, the display system can ultimately be simplified and the hardware cost can be lowered.

Further, since unnecessary pixels which should not be viewed from the holes of the mask unit are removed from the pixels of the synthesized image before the synthesized image is displayed on the display screen, it is possible to clearly view the image.

Further, since the image viewed changes substantially continuously when the user changes the viewing perspective, it is possible to eliminate the feeling of strangeness at the time of change of the perspective.

Further, it is possible to view a brighter image due to the condenser lenses.

While the invention has been described with reference to specific embodiments chosen for purposes of illustration, it should be apparent that numerous modifications could be made thereto by those skilled in the art without departing from the basic concept and scope of the invention.

What is claimed is:

1. A three-dimensional display comprising:

a synthesis unit for fetching a plurality of images capturing an object from a plurality of perspectives including a reference perspective and a plurality of different perspectives and combining said plurality of images such that each of said images of said different perspectives are shifted a distance corresponding to a distance between said reference perspective and the corresponding perspectives of said plurality of images in a direction of said perspectives to thereby generate a single synthesized image;

a display unit including a display screen having a number of display pixels corresponding to at least a number of pixels of said single synthesized image for displaying said single synthesized image on said display screen; and a mask unit comprising a thin sheet member positioned in front of said display screen and having a plurality of holes formed at predetermined intervals at corresponding locations facing said display pixels of said display screen.

2. A three-dimensional display as set forth in claim 1, wherein said holes of said mask comprise circular or polygonal holes.

3. A three-dimensional display as set forth in claim 2, wherein a diameter of said circular or polygonal holes is substantially equal to a diameter of said display pixels.

4. A three-dimensional display as set forth in claim 1, wherein said holes of said mask comprise slit-shaped, elongated holes.

5. A three-dimensional display as set forth in claim 4, wherein a width of said slit-shaped, elongated holes is substantially equal to a diameter of said display pixels.

6. A three-dimensional display as set forth in claim 1, wherein said synthesis unit further comprises:

a zoom unit for enlarging or reducing said plurality of images to generate a corresponding plurality of zoom images;

a shift unit for shifting said zoom images with respect to the position of a reference zoom image corresponding to said reference image of said reference perspective; and a mapping unit for mapping said reference zoom image and said shifted zoom images on a table having a pixel configuration substantially corresponding to said pixel configuration of said display screen to form said single synthesized image.

7. A three-dimensional display as set forth in claim 6, further comprising a correction unit for mapping at least one corrected zoom image between adjoining ones of said zoom images in said single synthesized image.

8. A three-dimensional display comprising:

a synthesis unit for fetching a plurality of images capturing an object from a plurality of perspectives including a reference perspective and a plurality of different perspectives and combining said plurality of images such that each of said images of said different perspectives are shifted a distance corresponding to a distance between said reference perspective and the corresponding different perspective of said plurality of images in a direction corresponding to said different perspectives to thereby generate a single synthesized image, said synthesis unit comprising a zoom unit for enlarging or reducing said plurality of images to generate a corresponding plurality of zoom images, a shift unit for shifting said zoom images with respect to the position of a reference zoom image corresponding to said reference image of said reference perspective, a mapping unit for mapping said reference zoom image and said shifted zoom images on a table having a predetermined pixel configuration to form said single synthesized image, and a filter unit for comparing an angle of incidence of light from display image pixels to a corresponding hole of a mask unit positioned closest to said display image pixels and a visual perspective angle when capturing a portion of the object shown by said display image pixels from a corresponding perspective and, when said angle of incidence and said visual perspective angle are not equal, removing said display image pixels from said single synthesized image when said single synthesized image is displayed;

a display unit comprising a display screen having a number of said display pixels corresponding to the number of pixels of said single synthesized image generated by said synthesis unit for displaying said synthesized image on said display screen, and having substantially the same pixel configuration as said table; and said mask unit comprising a thin sheet member positioned in front of said display screen of said display unit and having a plurality of said holes formed at predetermined intervals at corresponding locations facing said display pixels of said display screen.

9. A three-dimensional display as set forth in claim 8, further comprising a plurality of condenser lenses positioned between said display screen and said mask unit;

wherein a first area including a group of said display pixels centered on a corresponding first hole and having an angle of incidence of light from the outermost peripheral display pixels to said first hole being substantially equal to a maximum value of said visual angle is separated from a second area including a group of said display pixels centered on a corresponding second hole by setting a predetermined interval between said first hole and said second hole; and wherein said plurality of condenser lenses are dimensioned to be larger than said first area and said second area and one of said condenser lenses is positioned to correspond to each of said first and said second areas.

* * * * *